US012436733B2

(12) United States Patent
Merz et al.

(10) Patent No.: US 12,436,733 B2
(45) Date of Patent: Oct. 7, 2025

(54) AMBIENT SOUND LEVEL CONTROL

(71) Applicant: BANG & OLUFSEN A/S, Struer (DK)

(72) Inventors: Philipp Merz, Graz (AT); Knud-Erik Lauridsen, Herning (DK)

(73) Assignee: Bang & Olufsen A/S, Struer (DK)

( * ) Notice: Subject to any disclaimer, the term of this patent is extended or adjusted under 35 U.S.C. 154(b) by 235 days.

(21) Appl. No.: 18/322,784

(22) Filed: May 24, 2023

(65) Prior Publication Data

US 2024/0303031 A1 Sep. 12, 2024

(30) Foreign Application Priority Data

Mar. 10, 2023 (DK) ................................ 2023 00217

(51) Int. Cl.
*G06F 3/16* (2006.01)
*H04R 1/10* (2006.01)

(52) U.S. Cl.
CPC ........... *G06F 3/165* (2013.01); *H04R 1/1008* (2013.01)

(58) Field of Classification Search
CPC ................ H04R 1/1083; H04R 1/1008; H04R 2430/03; H04R 2460/01; G10K 11/00; G06F 3/165
See application file for complete search history.

(56) References Cited

U.S. PATENT DOCUMENTS 11,509,987 B2 * 11/2022 Dickins ................ H04R 1/1083
11,818,561 B1 * 11/2023 Nawfal .................... H04R 5/04
2014/0126734 A1 * 5/2014 Gauger, Jr. ...... G10K 11/17821 381/71.6
2014/0341387 A1 * 11/2014 Gauger, Jr. ...... G10K 11/17885 381/71.6
2015/0281830 A1 * 10/2015 Gauger, Jr. ............. H03G 3/32 381/71.6
2018/0197527 A1 7/2018 Guiu et al.
(Continued)

FOREIGN PATENT DOCUMENTS

CN 101625868 A * 1/2010 .............. H03G 3/32
EP 2793224 A1 10/2014
(Continued)

*Primary Examiner* — David L Ton
(74) *Attorney, Agent, or Firm* — Patterson + Sheridan, LLP

(57) ABSTRACT

A wearable audio device can include at least one speaker to provide an initial audio output signal; at least one sensor arranged to: sense at least one characteristic of the initial audio output signal, sense noise external to the wearable audio device, and provide at least one sensor signal related to at least one characteristic of the sensed initial audio output signal and at least one characteristic of the sensed noise; at least one input arranged to accept an input related to a desired level of attenuation of the noise; a processor arranged to: receive the at least one sensor signal and the selected desired level of attenuation, select at least one coefficient from a coefficient table based on the at least one sensor signal or the selected desired level of attenuation, and provide an attenuation signal related to the selected at least one coefficient; and at least one filter arranged to receive the attenuation signal from the processor and produce a filtered audio signal based on the attenuation signal, wherein the at least one speaker is configured to provide an attenuated audio output based on the filtered audio signal.

18 Claims, 7 Drawing Sheets

(56) References Cited

U.S. PATENT DOCUMENTS

| | | | | |
|---|---|---|---|---|
| 2019/0130928 | A1* | 5/2019 | Rule | G10K 11/17837 |
| 2020/0380945 | A1 | 12/2020 | Woodruff et al. | |
| 2021/0337299 | A1* | 10/2021 | Dickins | H04R 1/1083 |
| 2022/0293082 | A1* | 9/2022 | Yamabe | G10K 11/17821 |
| 2023/0370765 | A1* | 11/2023 | Greenwood | H04R 1/1083 |

FOREIGN PATENT DOCUMENTS

| | | | | |
|---|---|---|---|---|
| WO | 9325167 | A1 | 12/1993 | |
| WO | WO-2016032523 | A1 * | 3/2016 | G10K 11/175 |
| WO | WO-2017017037 | A1 * | 2/2017 | G10K 11/17821 |

* cited by examiner

AMBIENT SOUND LEVEL CONTROL

PRIORITY CLAIM

The present application claims priority to the Denmark Provisional Application No. PA 2023 00217, filed on Mar. 10, 2023, which is hereby fully incorporated herein by reference.

TECHNICAL FIELD

The present disclosure relates generally to noise cancelling systems and methods and, more specifically, to balanced active and passive noise cancelling systems and methods for use in wearable devices, such as headphones (e.g., circum-aural, super-aural and in-ear types), earbuds, hearing aids, and other personal listening devices.

BACKGROUND

Generally, noise reduction techniques in wearable devices, such as headphones, have been used to passively cancel out noise (passive noise cancellation) and/or actively cancel out noise (active noise cancellation). Passive noise cancellation (PNC) generally isolates as much noise as possible through sound-insulation materials or specially designed structures (e.g., in-ear headphones or over-ear headphones) such that the ear of a user can be sealed, plugged, or otherwise restricted from external noise. Thus, a reduction of external noise reaching the ears of the user can be achieved.

Active noise cancellation (ANC) typically can refer to the process of producing a sound from a speaker that attenuates noise (e.g., an unwanted or irritating sound at certain frequencies) present in an environment. To attenuate such noise, the speaker can be configured to produce sound having a similar amplitude and a similar-to-opposite phase to the unwanted sound. The sound produced is then combined with the unwanted sound and, due to the superposition of the sound waves, can reduce the amplitude of the opposing phase noise. For example, a maximum destructive interference for general ANC systems and varying degrees of destructive interference can be achieved. Generally, there are two ways of accomplishing ANC: feedback and feedforward techniques. Feedback techniques include an error microphone near the speaker that senses the sound after the sound produced by the speaker has combined with the noise. The audio data from the error microphone is sent to a controller, which then adjusts the sound produced by the speaker based on the received audio data. In feedforward techniques, a reference microphone senses noise before it combines with the sound produced by the speaker. The audio data from the reference microphone is sent to the controller, which causes the speaker to produce a sound similar in amplitude but opposite in phase.

Typically, wearable devices, such as headphones, only offer three modes of noise cancellation operation for the user to choose between. For example, one mode can provide maximum active and passive noise reduction for the user. A second mode, which can only be configured to provide passive noise reduction to the user, can be implemented and a third mode, which can only be configured to provide the user with full transparency, can be implemented. In some examples, in-between modes can be offered with various levels of active noise cancellation. However, the overall transfer functions of the wearable device for attenuation during in-between mode(s) cannot be balanced, which means that high frequencies cannot be attenuated at the same levels as low frequencies.

Thus, there is a need for improved noise filtering design strategies to achieve a balanced attenuation in all noise cancellation modes, particularly in in-between modes.

SUMMARY

In an embodiment, a wearable audio device comprises at least one speaker to provide an initial audio output signal; at least one sensor arranged to: sense at least one characteristic of the initial audio output signal, sense noise external to the wearable audio device, and provide at least one sensor signal related to at least one characteristic of the sensed initial audio output signal and at least one characteristic of the sensed noise; at least one input arranged to accept an input related to a desired level of attenuation of the noise; a processor arranged to: receive the at least one sensor signal and the selected desired level of attenuation, select at least one coefficient from a coefficient table based on the at least one sensor signal or the selected desired level of attenuation, and provide an attenuation signal related to the selected at least one coefficient; and at least one filter arranged to receive the attenuation signal from the processor and produce a filtered audio signal based on the attenuation signal, wherein the at least one speaker is configured to provide an attenuated audio output based on the filtered audio signal.

In another embodiment, a method comprises correlating a plurality of filter coefficients with a plurality of user-selectable audio attenuation levels to form a coefficient table; and storing the coefficient table on a wearable audio device.

The above summary is not intended to describe each illustrated embodiment or every implementation of the subject matter hereof. The figures and the detailed description that follow more particularly exemplify various embodiments.

These and other advantages and features will become more apparent from the following description taken in conjunction with the drawings.

BRIEF DESCRIPTION OF THE DRAWINGS

Subject matter hereof may be more completely understood in consideration of the following detailed description of various embodiments in connection with the accompanying figures, in which.

Figure 1:
FIG. 1 is a perspective view of a set of headphones, according to an embodiment.

While various embodiments are amenable to various modifications and alternative forms, specifics thereof have been shown by way of example in the drawings and will be described in detail. It should be understood, however, that the intention is not to limit the claimed disclosure to the particular embodiments described. On the contrary, the intention is to cover all modifications, equivalents, and alternatives falling within the spirit and scope of the subject matter as defined by the claims.

DETAILED DESCRIPTION

Reference now will be made in detail to embodiments of the disclosure, one or more examples of which are illustrated in the drawings. Each example is provided by way of explanation in the disclosure and is not limited thereto. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents. As used herein, the term "or" is generally intended to be inclusive (i.e., "A or B" is intended to mean "A or B or both"). The terms "first." "second," and "third" can be used interchangeably to distinguish one component from another and are not intended to signify location or importance of the individual components.

Throughout the specification, and in the claims, the term "connected" means a direct electrical, mechanical, or magnetic connection between the things that are connected, without any intermediary devices. The terms "coupled" or "integrated" mean either a direct electrical, mechanical, or magnetic connection between the things that are connected or an indirect connection through one or more passive or active intermediary devices. The term "circuit," "module." or "mechanism" can refer to one or more passive and/or active components that are arranged to cooperate with one another to provide a desired function.

The terms "substantially." "close," "approximately." "near," and "about" generally refer to being within +/−10% of a target value. Unless otherwise specified the use of the ordinal adjectives "first." "second," and "third," etc., to describe a common object, merely indicate that different instances of like objects are being referred to and are not intended to imply that the objects so described must be in a given sequence, either temporally, spatially, in ranking, or in any other manner.

It is to be understood that the terms so used are interchangeable under appropriate circumstances such that the embodiments of the disclosure described herein are, for example, capable of operation in other orientations than those illustrated or otherwise described herein.

The terms "left," "right," "front." "back." "top." "bottom," "over," "under," and the like in the description and in the claims, if any, are used for descriptive purposes and not necessarily for describing permanent relative positions.

The present disclosure relates to systems and methods for noise cancelling and, more specifically, to balanced active and passive noise cancelling systems and methods for use in wearable devices, such as headphones (e.g., circum-aural, super-aural and in-car types), earbuds, and other personal listening devices. In such systems, user-adjustable attenuation is provided, enabling a user to tune or adjust audio according to their preferences or needs.

FIG. 1 depicts a set of headphones 100 according to an embodiment. Headphones 100 can comprise a headband 102 pivotally coupling two earphone units 104 at opposing ends. Headband 102 can be adjustable such that the length of headband 102 between earphone units 104 can be shortened or lengthened. Headband 102 can optionally include a padded portion 106 to improve user comfort when worn.

Though headphones 100 of the embodiment of FIG. 1 (and other embodiments discussed herein) generally relate to or discuss headphones that are worn over the cars of a user, this disclosure and the various embodiments are not limited to over-ear headphones. Thus, aspects of the disclosure can also relate to in-car earphones (often referred to as "ear buds"), earphones worn on the cars without completely covering the cars, one or more earphone units 104 or components arranged within other devices that position the earphone(s) relative to one or more cars of a user (such as headsets, or other wearable devices such as hats, glasses, or headbands), hearing aids, and other devices unless explicitly stated otherwise herein.

Each earphone unit 104 can comprise an earcup 108 and an car cushion 110. Earcups 108 can house electrical components, such as speaker drivers or transducers, configured to produce sound (e.g., audio output signals). An exterior earphone unit 104 can include one or more inputs that can be used to receive user input. Input can be one or more of buttons, rotary knobs, wheels, dials, sliders, touch sensitive surfaces, gesture-controlled mechanisms, and the like. Input can be configured to receive user input to control power, volume, level of ambient noise attenuation, ANC, and other features of headphones 100. Input can be located anywhere on the exterior of headphones 100, such that input remains accessible for manual user input when worn by a user. For example, a power control input 111 can be integrated to activate and deactivate the headphones. In another example, an attenuation input 112 can be integrated, such that the attenuation or a level of attenuation provided to the user can be controlled (e.g., activating and deactivating ANC, adjusting the level of external or ambient noise attenuation, etc.), which is described in greater detail below.

Earcups 108 can further include one or more input ports 114 configured to receive a cable connector and one or more indicator lights 116 configured to convey status information of headphones 100. The arrangement of input, input ports 114, and indicator lights 116 can vary between earphone units 104 on a single set of headphones 100.

Figure 2:
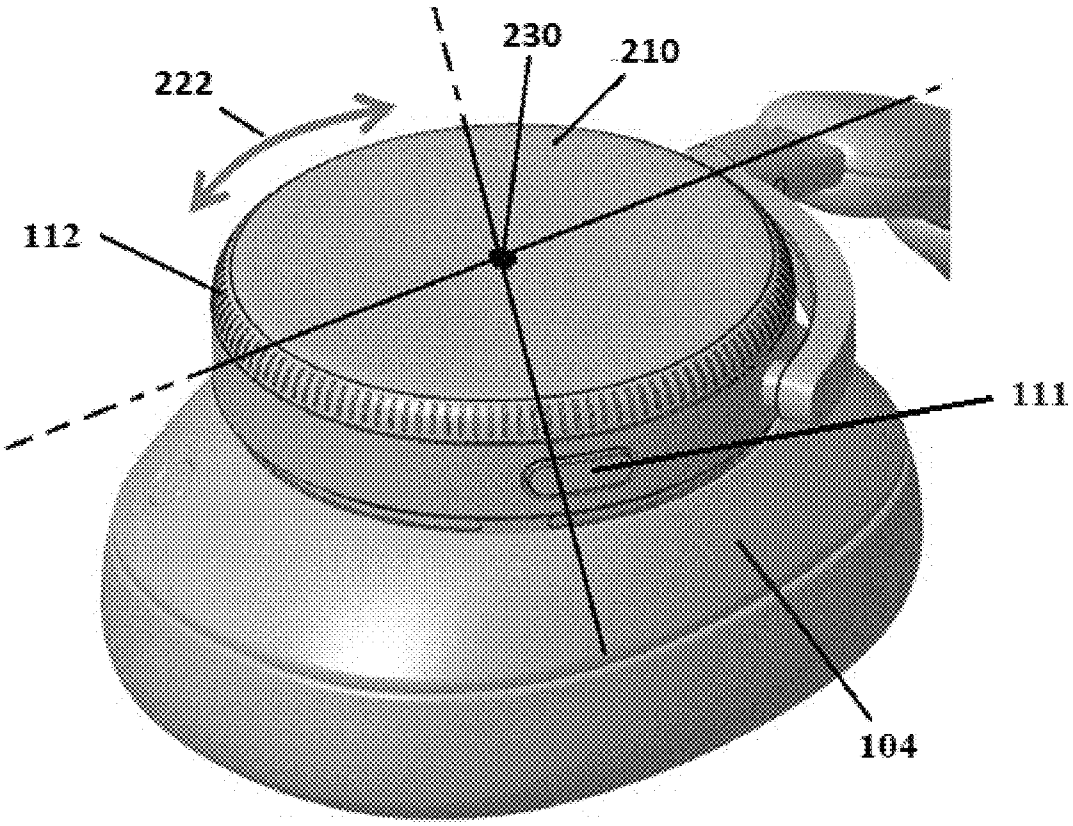
FIG. 2 is a partial view of the set of headphones of FIG. 1, further including an integrated user input for attenuation selection, according to an embodiment.

FIG. 2 depicts an earphone unit 104 comprising power input 111 and attenuation input 112 integrated into one earphone unit 104. In embodiments, user attenuation input 112 can be coupled to earphone unit 104, such that a level of ambient noise attenuation provided to the user can be controlled (e.g., to what extent external noise is heard by the user). In embodiments, user attenuation input 112 can be coupled to earphone unit 104 via a rear-surface (not shown). In embodiments, user attenuation input 112 can comprise a front surface 210 to be displayed outward from one or more earphone units 104, facing an individual. When integrated into one or more earphone units 104, comprising one or more speakers (integrated within earphone units 104), user attenuation input 112 can act as a wheel or dial that can be freely rotated (360°) in a clockwise and counterclockwise rotation 222 about its center axis 230. In embodiments, the rotation of user attenuation input 112 can correspond to or alter a variety of preferences (e.g., units of measurement) in which user attenuation input 112 is integrated, such as decibel or frequency control (up or down), transparency mode level, transparency of active noise-cancelling (ANC) functions, noise attenuation control, or other functions, as assigned and programmed by appropriate software.

For example, when user attenuation input 112 is rotated, each individual step, degree of, or "click" in a rotation can be associated with a unit of increment or decrement of the attenuation experienced by the user. In examples, each rotation, including one or more increments or decrements of steps, can alter and control the attenuation of, for example, external noise (e.g., attenuated audio output signals), provided to the user. In one example, the number of possible attenuation levels can vary between about 30 and about 60, or between about 35 and about 55, or between about 40 and about 50, in other examples. In embodiments, an automated or adaptive selection of the attenuation level, based on input from a selected or detected acoustics scene of the outside environment, can be determined based on the received signals from the one or more microphones (308A, 308B, and 312 in FIG. 3), and corresponding attenuation can be implemented. For example, the system can automatically recognize a user leaving their home, which can have had a relatively quiet acoustic environment, to an outdoor environment with noise from traffic, equipment, and people. In this example, the attenuation level can be automatically adjusted to attenuate the additional unwanted noise, or at least filter out a portion of the ambient noise, such that a particular frequency or range of frequencies are heard and others are attenuated.

In other embodiments, user attenuation input 112 can have some other structure, such as integrating one or more of buttons, sliders, touch sensitive surfaces, gesture-controlled mechanisms, and the like. User attenuation input 112 also or instead can be configured to receive user input to control power, volume, ambient noise attenuation, and other features of headphones 100. In examples other than the one depicted in FIG. 2, user attenuation input 112 can be located anywhere on the exterior of headphones 100, such that user attenuation input 112 remains accessible for manual user input when worn by a user.

Figure 3:
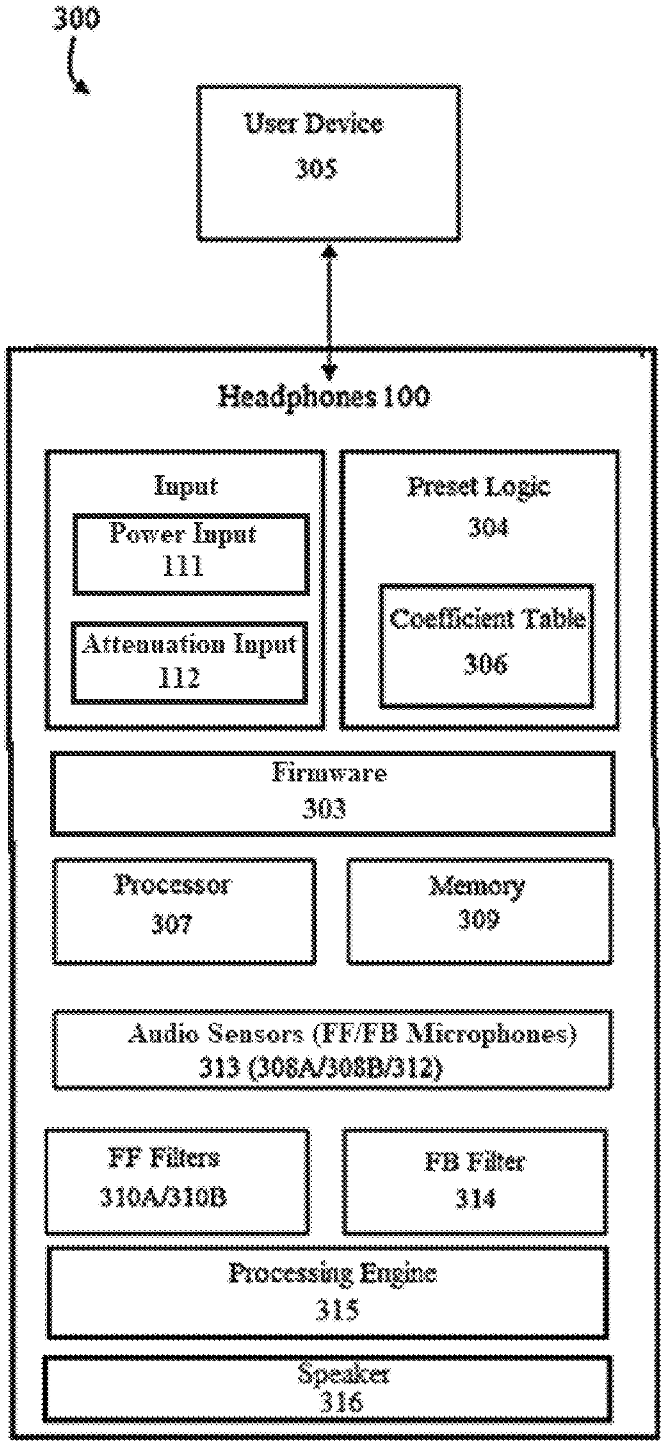
FIG. 3 is a block diagram of a system for configuring one or more features of headphones based on detected attenuation states, according to embodiments.

FIG. 3 is a block diagram of a system 300 that includes headphones 100 and a user device 305. An example of headphones 100 has already been discussed and is consistent with headphones 100 in FIG. 1 and others herein unless otherwise explained. Moreover, in other embodiments of system 300, headphones 100 can be replaced with another wearable audio device. User device 305 can comprise a smart phone, smart watch, tablet, computer, or other device, as will be discussed in more detail below.

In system 300, headphones 100 include components and features to determine and adjust an attenuation level of sound provided to a user through headphones 100. Functionally, headphones 100 can generally comprise one or more inputs as described above (including power input 111 and/or user attenuation input 112); firmware 303, a processor 307; a memory 309; one or more audio sensors 313, including one or more feedforward (FF) audio sensors (e.g., feedforward microphones 308A and 308B) or feedback (FB) audio sensors (e.g., a feedback (FB) microphone 312); one or more FF filters 310A and 310B; one or more FB filters 314; and one or more engines, for example an attenuation level processing engine 315. In some examples, various components depicted in FIG. 3 can be combined, such as processor 307 and processing engine 315; and memory 309 and coefficient table 306. Thus, FIG. 3 is an example block diagram that is functionally oriented for the purposes of aiding understanding in this discussion.

In embodiments, user device 305 can be communicatively coupled to headphones 100. User device 305 can comprise processing and memory capabilities and can establish a wireless or wired connection with a network or otherwise communicate to headphones 100, such as by Bluetooth. Headphones 100 can be configured to provide two-way data communication with user device 305 via a wired or wireless connection, transmitting a signal, for example, sound (e.g., music, telephonic communications, travel direction dictations, etc., operable to be provided to the user). In embodiments, electronic devices with earphone unit 104 can be configured to provide two-way data communication with user device 305 via a wired or wireless connection. In embodiments, control of headphones 100 can be processed and controlled by processor 307. In embodiments, attenuation processing engine 315 can be configured to process and control the attenuation, corresponding to the user attenuation selected based on the attenuation input 112. In embodiments, communicatively coupled can include transmitting signals to power headphones 100 on/off, connect to user device 305, control the volume level, control the amount of external noise attenuation, etc.

In embodiments, user device 305 can run an instance of a user device interface designed to facilitate user interaction with one or more features of headphones 100 or any electronic device comprising earphone unit 104, for example, to control the power, volume level, attenuation level, etc., of the headphones 100. In embodiments, the device interface can comprise a mobile application, web-based application, or any other executable application framework.

Turning to headphones 100, processor 307 can be any programmable device that accepts digital data as input, is configured to process the input according to instructions or algorithms, and provides results as outputs. In embodiments, processor 307 can be a central processing unit (CPU) or a microcontroller or microprocessor configured to carry out the instructions of a computer program. Processor 307 is therefore configured to perform at least basic arithmetical, logical, and input/output operations.

Memory 309 can comprise volatile or non-volatile memory as required by the coupled processor 307 to not only provide space to execute the instructions or algorithms, but to provide the space to store the instructions themselves. In embodiments, volatile memory can include random access memory (RAM), dynamic random-access memory (DRAM), or static random-access memory (SRAM), etc. In embodiments, non-volatile memory can include, for example, read-only memory (ROM), flash memory, ferroelectric RAM, hard disk, or optical disc storage. It shall be understood that the foregoing lists are in no way limiting to the type of memory that can be used, as these embodiments are given only by way of example and are not intended to limit the scope of the present disclosure.

System 300 can be implemented irrespective of the number or type of engines. In embodiments, the processing engine 315 can be within or outside a housing of headphones 100. In embodiments, the processing engine 315 can be within or outside a housing for any electronic device. In an embodiment, the processing engine 315 can operate on a server remote from headphones 100. In alternate embodiments, the processing engine 315 can operate on a server remote from any electronic device with functional earphone unit 104 and user device 305. In embodiments, the processing engine 315 can operate on user device 305. Audio sensors 313, which can be located throughout the headphones 100, can be used to detect quantities of signals which can contribute to more effective attenuation determination processing, as described herein. In embodiments, audio sensors 313 can include one or more feedforward microphones 308A and 308B and one or more feedback microphones 312 that receive audio signals, whether the audio be external audio or internal audio respective of the earphone unit 104.

In embodiments, the one or more inputs 111, 112 can be configured to control one or more functions of the headphones 100. For example, one or more inputs can control the volume level of the headphones (e.g., one button for incrementing volume and one button for decrementing volume). In embodiments, input can be sliders to increment and decrement between maximum and minimum ranges of volume level, ANC level, and the like. In embodiments, input can be configured to activate and deactivate the headphones, ANC, and other various features. In one embodiment, the attenuation input 112 can be solely responsible for control over the attenuation of the headphones 100 (e.g., pressing the attenuation input 112 to activate and deactivate ANC and/or select between ANC modes and rotate the attenuation input 112 to increment and decrement between levels of attenuation).

In embodiments, based on the attenuation level set according to the one or more inputs (e.g., attenuation input 112), a control signal can be transmitted to a preset logic 304. Based on the attenuation level set, preset selection logic 304 can determine a coefficient or set of coefficients associated with the implemented attenuation level selected from a predetermined or preset coefficient table 306. In embodiments, coefficient table 306 can contain a coefficient or set of coefficients for each defined level of active attenuation. In embodiments, the coefficient or set of coefficients can be installed or preinstalled onto firmware 303 of the wearable device. In embodiments, the coefficient or set of coefficients can be installed or periodically updated with new or additional coefficients when additional or more effective coefficients are calculated based on a custom filter improvement algorithm, which can provide more effective flat or balanced attenuation (described in greater detail below). In embodiments, the coefficient or set of coefficients can be determined by the processor 307 on the headphone 100 itself by providing at least one parameter set, interpolating between parameters, and executing the ANC parameter and coefficient improvement algorithm (described in more detail below). In embodiments, the determined or updated coefficients can then be transmitted to one or more feedforward filters 310A and 310B (e.g., biquad filters or finite impulse response (FIR) filters) and the attenuation level can be updated in combination with signals received from the one or more audio sensors 313. In embodiments, while in operation, one or more audio sensors 313 can sense external or internal noise. ANC can be configured to implement the filtering process, which can sense ambient noise by the one or more audio sensors 308A and 308B and filter the data through to the one or more feedforward filters 310A and 310B. In embodiments, based on the attenuation level indicated by the input, selected by the user, the one or more feedforward filters 310A and 310B can process the incoming external noise, in combination with the coefficient or set of coefficients, and transmit the adjusted noise attenuation output via speaker 316 (i.e., effective with the desired attenuation level, while maintaining a flat or balanced attenuation). A flat or balanced attenuation can provide users with a more balanced and more natural sound but at a more preferred attenuation level, which is described in greater detail with reference to FIG. 7.

In embodiments, an additional feedback filter 314 can be implemented, which can process feedback signals received from at least one feedback audio sensor, for example, a feedback microphone 312. The signal can be processed and an output signal can be combined with the output signals from the one or more feedforward filters 310A and 310B.

Figure 4:
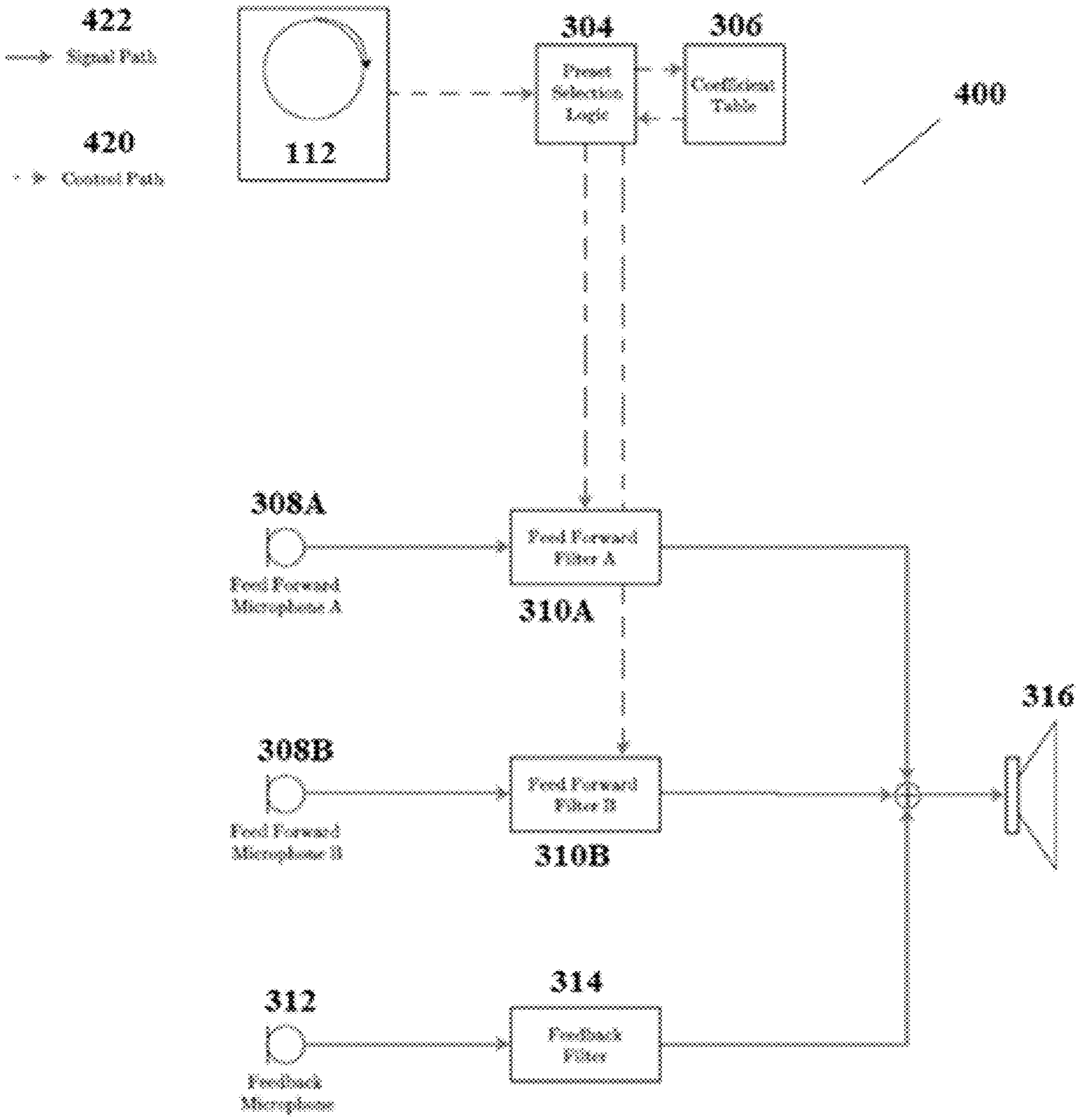
FIG. 4 is an ambient sound control flow diagram implementing a filter design, according to embodiments.

FIG. 4 depicts an ambient sound control (ASC) flow diagram 400 for controlling and balancing attenuation of a wearable device, for example, headphones 100. In examples, based on the attenuation level set, according to the attenuation input 112, a control signal 420 can be transmitted to a preset logic 304. Based on the attenuation level set, the preset selection logic 304 can determine a coefficient or set of coefficients associated with the implemented attenuation level selected from a predetermined or preset coefficient table 306. In embodiments, the coefficient table 306 can contain a coefficient or set of coefficients for each defined level or step of active attenuation. In embodiments, the determined or updated coefficients are then transmitted to one or more feedforward filters 310A and 310B and the attenuation level can be updated in combination with signals received from the one or more audio sensors 308A and 308B. For example, if there are 30 distinct levels of variation (e.g., the knob can rotate between 30 steps or notches), each distinct level can be associated with its own unique set of coefficients (e.g., each determined coefficient associated with each increment of each respective feedforward filter). In another example, if there are 60 distinct levels of variation (e.g., the knob can rotate between 60 steps or notches), each distinct level can be associated with its own unique set of coefficients (e.g., each determined coefficient associated with each increment of each respective feedforward filter). It should be understood that the more distinct levels of variation, the smoother the filtration and attenuation that can be achieved for the user.

In embodiments, the coefficients (e.g., biquad coefficients or FIR coefficients) can be updated and transmitted to the one or more feedforward filters 310A and 310B with a click-free coefficient change operation. In embodiments, the click-free coefficient change can use an additional filter, parallel to the feed forward filters 310A and 310B. The additional filter can be an initially empty and muted filter. The additional filter can be updated with the new coefficients and then un-muted, while at the same time the original filter is muted (cross-fade). The muting and un-muting happens via a hardware-controlled gain, which is updated quickly enough so as to not cause any audible noises. For example, feedforward microphones 308A and 308B and feedback microphone 312 can be communicatively coupled to their respective filters 310A, 310B, and 314. A command can be received to change attenuation levels of one of the feedforward filters to an alternative preset (e.g., preset 2). The additional filter can then be loaded with the coefficient corresponding to the changed attenuation level. Once loaded, the filter can then be communicatively connected to the feedforward microphone being changed. Once communication has been made, the feedforward filter originally connected can be faded out and the additional filter faded in, such that no or minimal audible noise can be heard by the user. Once the additional filter has been completely faded in, the original feedforward filter can be disconnected from the feedforward microphone and remain muted until another attenuation level change occurs, in which the process can repeat (the original feedforward filter now being used as the additional filter for attenuation level transitioning).

In embodiments, one or more feedforward filters 310A and 310B can have a distinct filter, each filter being associated with a distinct attenuation increment/step and coefficient among the coefficient table 306. For example, separate filters can be programed or updated, among the one or more feedforward filters 310A and 310B, with the corresponding coefficients determined for the determined level of attenuation. In embodiments, with the dual feedforward ANC system, two coefficients from the coefficient table can be necessary to update both feedforward filters 310A and 310B. In embodiments, the dual feedforward ANC system can increase high frequency performance. However, it is to be understood that while two feedforward filters 310A and 310B are depicted, a single feedforward filter can be utilized. In embodiments, additional feedforward filters can be implemented, wherein the number of feedforward filters can correspond to the number of feedforward audio sensors utilized. In embodiments, the same number of coefficients necessary for updating the feedforward filters can be equivalent to the quantity of feedforward filters. In embodiments, the determined or updated coefficients can be transmitted to the one or more feedforward filters 310A and 310B by the preset selection logic 304 and update the attenuation based on the attenuation level designated by the attenuation input 112.

In operation, one or more audio sensors 308A and 308B can sense noise external to the headphones, which some or all frequencies can otherwise, normally, be heard by the user. ANC can be configured to implement a filter design which can sense ambient noise by the one or more audio sensors 308A and 308B and filter the data through to the one or more feedforward filters 310A and 310B. In embodiments, based on the attenuation level indicated by the attenuation input 112, selected by the user, the one or more feedforward filters 310A and 310B can process the incoming external noise, in combination with the coefficient or set of coefficients, and transmit the processed and filtered attenuated noise (e.g., the attenuated audio output signal) through the speaker 316 via the signal path 422 (i.e., effective with the selected and desired attenuation level, while maintaining a flat or balanced attenuation).

In embodiments, an additional feedback filter 314 can be implemented, which can process feedback signals received from a feedback audio sensor, for example, a feedback microphone 312. The signal can be processed and an output signal can be combined with the output signals from the one or more feedforward filters 310A and 310B. In embodiments, based on the feedback received, a more effectively attenuated sound, subject to the determined attenuation level via the attenuation input 112, can be realized by the user. In embodiments, the feedback ANC system (i.e., the feedback filter 314 and feedback microphone 312) can run at all times during use of the wearable device, for example, with a static filter. In embodiments, the feedback ANC system can remain active, even during a full transparency mode, for reduction of the sensation of increased loudness, particularly during low frequencies, known as the occlusion effect. In embodiments, the attenuation of the feedback ANC system can also be compensated by the feedforward system (i.e., the one or more feedforward filters 310A and 310B and the feedforward microphones 308A and 308B).

In embodiments, the resulting output from the speaker 316 to the user provides a flat or near-flat attenuation at the desired decibel level across frequency ranges, which is described in greater detail below, particularly with reference to FIG. 7. In embodiments, a flat or near flat attenuation level can occur at −1 dBs, −10 dBs, −20 dBs, −30 dBs, −40 dBs, and otherwise in-between dB levels, based on the desired level of attenuation. In embodiments, a flat or near flat attenuation level can be achieved at 15 dBs, 12 dBs, 5 d, 1 dB, and otherwise in-between, which can be implemented for boosting preferred sounds or signals for the user (e.g., hearing-aid like functionality). In other embodiments, the plurality of frequencies can include a range of frequencies between 0 Hz and 2.5 kHz, such as 1 Hz and 20 kHz, or any subrange therewithin. In embodiments, a flat or near flat attenuation level can occur at frequency ranges from 1 Hz, 10 Hz, 100 Hz, 1 kHz, 5 kHz, 10 KHz, 20 kHz, and otherwise in-between frequency levels. In other embodiments, the plurality of decibel levels can include a range between −50 dB and 12 dB, or −40 dB to 0 dB, or any subrange therewithin.

In embodiments, high pitched frequencies (e.g., sirens) and/or low frequencies (e.g., vehicle exhaust) can be filtered out while still maintaining clarity for mid-range frequencies (e.g., footsteps, voices, conversations, etc.). In embodiments, a portion of the unwanted noise can be attenuated to a desired decibel level based on the increment selected via the attenuation input 112. For example, if a user is walking down a busy street/sidewalk, with alternative conventional headphones that only implement full ANC modes, no external noises can be heard by the user. If implementing a mode with no ANC, all external noise can be heard by the user, including sound produced through the headphones 100. These instances can create unwanted or undesirable scenarios, which more effective solutions can be implemented with greater benefit to the user. For example, in full ANC mode, it is possible that the user would not hear someone behind him or her, for example, footsteps of someone approaching from behind, a bicyclist not paying attention, or even a vehicle approaching unseen. In another example, enabling partial attenuation that allows some noise to persist can allow the user to, e.g., have a conversation with someone else, while still wearing/using headphones 100. The in-between attenuation steps can allow the voice of another person to pass through the filter, while maintaining ANC or attenuation of other louder or more undesired noise (e.g., traffic, activity within the vicinity of the user), etc. Thus, an ability to sense, recognize, and still allow some noise though (e.g., within the in-between attenuation steps) to the user, at least to a certain degree of attenuation, is beneficial.

In embodiments, the lowest or minimum level of attenuation can effectively provide the user with a full transparency mode (e.g., all background noise is received with no noise cancelling applied). In embodiments, the highest or maximum level of attenuation can effectively provide the user with maximum active and maximum passive attenuation. An additional or alternative level can effectively provide the user with only passive noise reduction. In embodiments, a plurality of in-between levels (e.g., between the maximum and minimum levels of attenuation) based on the implemented attenuation level can effectively provide the user with varying levels of attenuation.

In embodiments, noise can be attenuated by 15 dBs, 12 dBs, 1 dB, −1 dB, −10 dBs, −20 dBs, −30 dBs, −40 dBs, etc., and otherwise in-between based on selected increment levels via the attenuation input 112. In embodiments, a plurality of presets can be implemented to provide the user the impression that there are no steps (e.g., notable extreme levels of adjustment in sound variation between attenuation levels) and the ambient sound control adjustments are or appear to be seamless to the user. The greater number of presets implemented provide a more effective seamlessness to the user. In embodiments, the one or more feedforward filters 310A and 310B can comprise a plurality of tunable filters, which can increase the seamlessness of the user experience. In embodiments, these tunable filters can correlate to the number of coefficients as a one-to-one ratio, which can keep the attenuation steps small.

Figure 5:
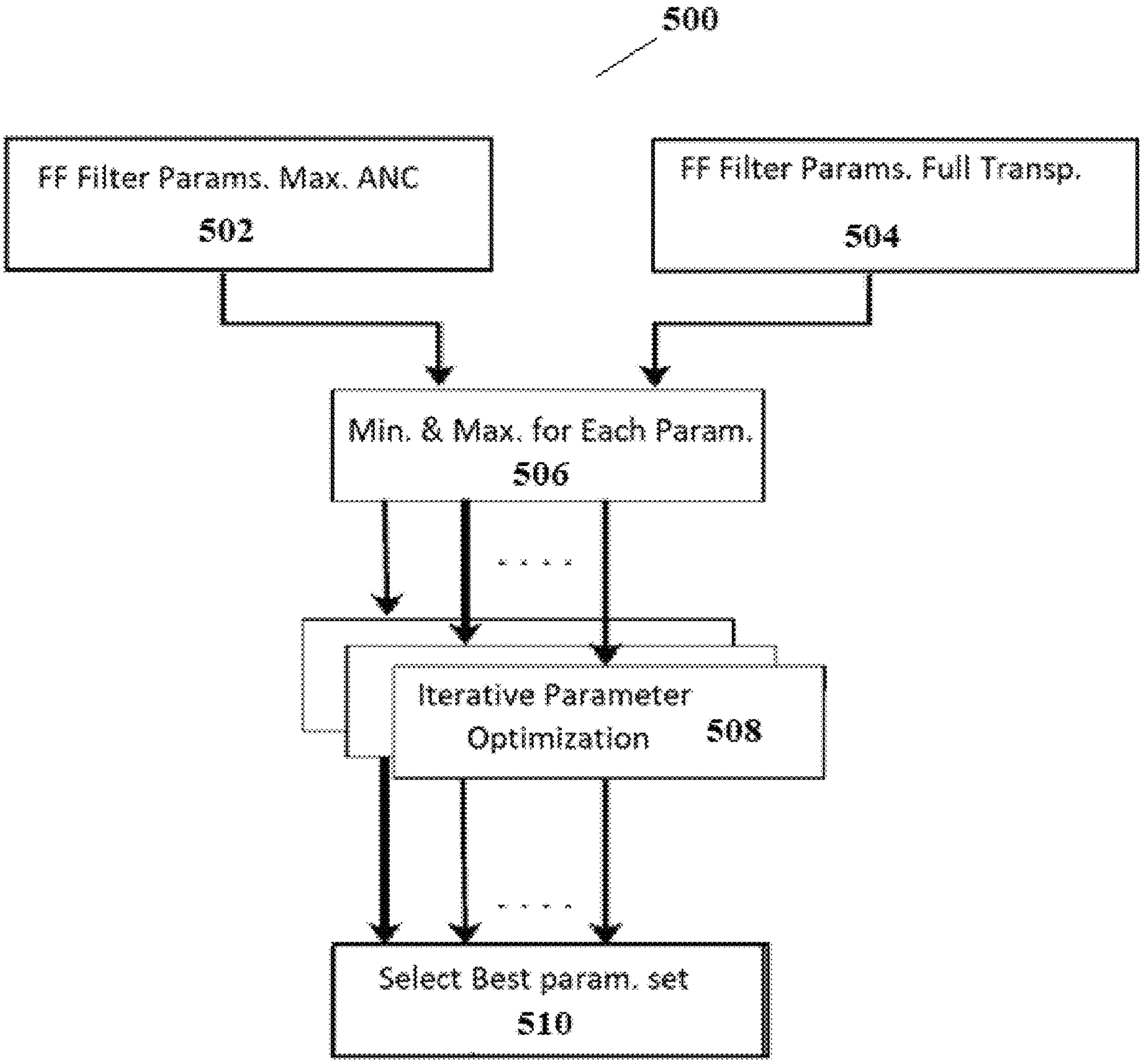
FIG. 5 is a high-level block diagram for ANC parameter and coefficient improvement, according to embodiments.

FIG. 5 depicts a high-level block diagram for ANC parameter and coefficient improvement. In embodiments, the filter parameters and coefficients can be determined offline. For example, the parameters and coefficients can be computed in the design or manufacturing phase of the wearable device and installed as part of the firmware 303 utilized by the wearable device. In embodiments, a parameter adaptation algorithm or an iterative parameter improvement technique can be implemented to determine the best or most efficient parameter set(s), which designate or otherwise determine the coefficients or set of coefficients implemented for each level of attenuation set by the user for each attenuation step. In embodiments, if and when additional or more effective algorithms, results, settings, or set of coefficients can be determined, an update can be transmitted to the wearable device, e.g., headphones 100, from user device 305, in which an updated coefficient table 306 can be installed onto the firmware 303 of the wearable device.

In embodiments, the filter design for these in-between steps can be different from normal ANC tuning, since the target curve is not unique. For these reasons a custom filter improvement algorithm 500 has been developed, which can produce the filter parameter sets offline and prior to installing the information on the firmware of the wearable device. At 502, feedforward filter parameters for maximum ANC performance can be determined. At 504, feedforward filter parameters for full transparency can be determined. At 506, information determined at 502 and 504 are calculated and minimum and maximum values are determined for each parameter.

At 508 the algorithm for iterative parameter improvement can be performed. In embodiments, numerous values within the ranges of the maximum and minimum parameters, determined at 502 and 504, can be taken and used to simulate the effective attenuation. In embodiments, comparison can be made between the desired level of attenuation and the effective attenuation provided based on the selected parameters. In embodiments, the iterative parameter improvement algorithm can narrow down the most optimal parameters for attenuation at desired levels (e.g., the set of parameters that provide the least amount of offset or the resulting attenuation is within a threshold value) by calculating the difference between the desired level of attenuation and the actual attenuation achieved with the corresponding parameters. In embodiments, based on the calculated differences, a random offset to the previously selected parameters can be the selected and the calculation can be redone. In embodiments, additional offsets can be applied and the calculation can be rerun until there is no difference (or the difference is below a threshold level) between the previous calculated difference (i.e., with the previously include offset) and the most current calculated difference (i.e., with the most current offset). Thus, narrowing down the parameters to be used. In embodiments, the iterative parameter improvement algorithm can run a plurality of calculations in parallel. In embodiments, the iterative parameter improvement algorithm can be run, approximately, two-hundred times in parallel. At 510, the best or most efficient set of parameters, determined at 508, are selected for use in the wearable device for each level of attenuation selectively available. In embodiments, the coefficients can be determined based on the determined parameters for each level of attenuation available. In embodiments, the coefficients can be installed on the firmware of the wearable device as the coefficient table 306 for selection based on the level of attenuation selected.

In embodiments, the ANC parameter and coefficient improvement can be configured to be capable of matching the total attenuation to an arbitrary target attenuation. Thus, equalization for the real world, in addition to the UI element 112, can be realized. In embodiments, the ANC parameter and coefficient improvement algorithm can be utilized with an arbitrary target response. Thus, not only can a balanced or flat passive and active noise attenuation be achieved in some situations, attenuation according to user preferences also can be achieved. For example, a flat (or flatter) noise attenuation that would otherwise be realized without applying techniques and features as discussed herein can be achieved but with an amplification of a particular bandwidth frequency (e.g., 1 kHz) for better speech intelligibility. Such speech-bandwidth amplification can be adjusted by a user input, as previously discussed with reference to, e.g., FIG. 2.

The high-level block diagram for ANC parameter and coefficient improvement of the embodiment of FIG. 5 (and other embodiments discussed herein) generally relates to or discusses improving attenuation parameters among headphones operable by a user. FIG. 5 is just one example embodiment and does not limit other embodiments within the scope of the disclosure.

Figure 6:
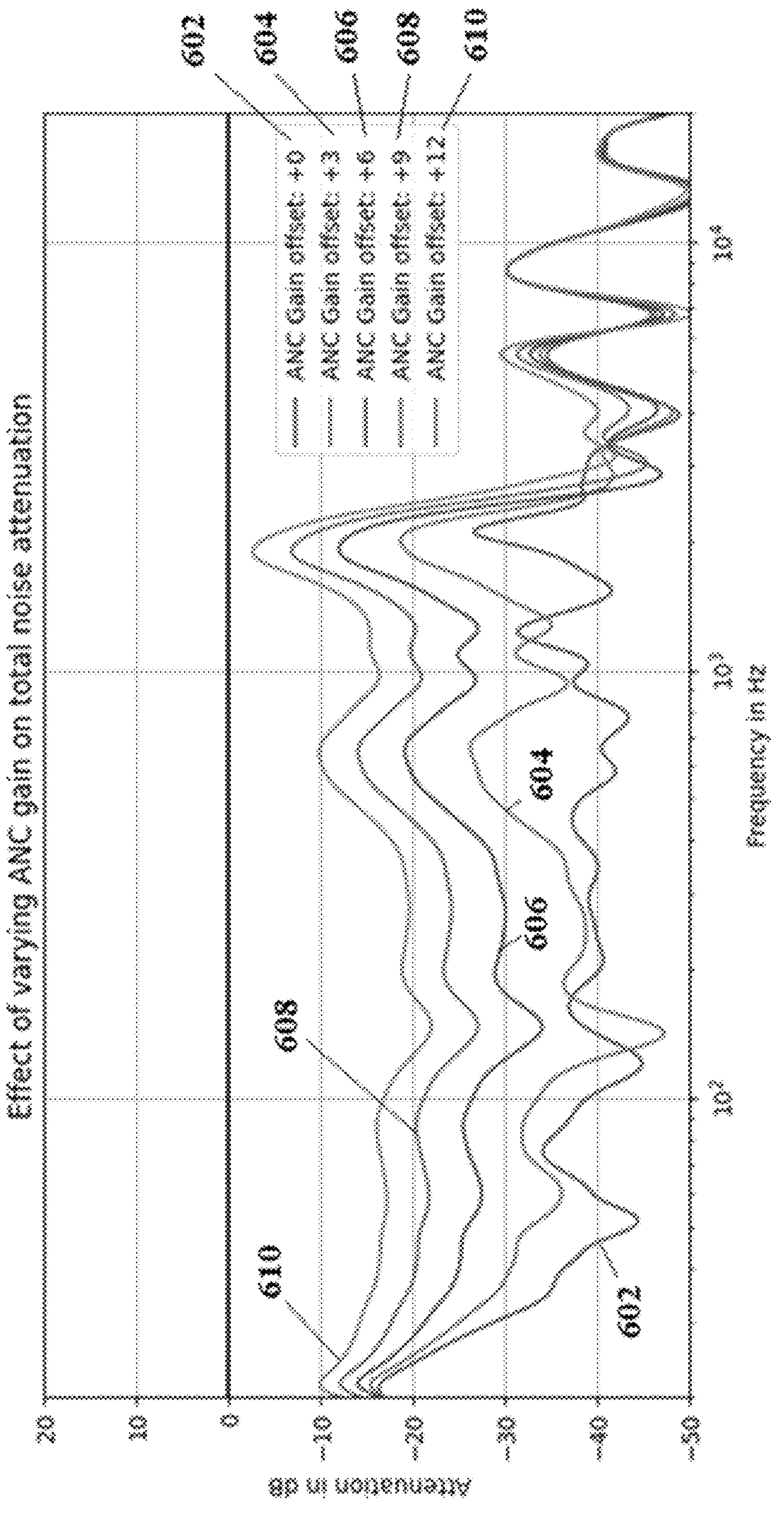
FIG. 6 is a graphic illustration showing the effect of varying ANC gains for total noise attenuation in current ANC solution devices.

FIG. 6 is a graphic illustration showing the effect of varying ANC gains on total noise attenuation in current ANC device examples. Conventional wearable devices that implement ANC technology are typically restricted to only being able to adjust the feedforward ANC gain. FIG. 6 shows the effect of this restriction. As depicted, the amount of sound pressure level (SPL) reduced, measured in decibels (dB), is depicted graphically as a function of frequency (Hz). As depicted the noise attenuation level is expressed as the y-axis and the frequency is expressed as the x-axis. Five example scenarios are depicted to illustrate how effective attenuation is at varying frequency levels and ANC gain offsets with restricted ANC control. For example, scenario 602 illustrates the effectiveness of total noise attenuation with an ANC gain offset of 0. For example, scenario 604 illustrates the effectiveness of total noise attenuation with an ANC gain offset of +3. scenario 606 illustrates the effectiveness of total noise attenuation with an ANC gain offset of +6. scenario 608 illustrates the effectiveness of total noise attenuation with an ANC gain offset of +9. scenario 610 illustrates the effectiveness of total noise attenuation with an ANC gain offset of +12. It is to be noted that, in all of the examples, conventional wearable devices fail to deliver a flat or relatively flat attenuation across the frequency spectrum. Instead, a sporadic and unbalanced attenuation can be seen across the frequency spectrum for each ANC gain offset examples.

Particularly, it can be seen that the attenuation above 2.5 kHz is almost constant and that there are strong variations in the spectrum (e.g., in the lowest setting the user can hear noises in the 100 Hz and be attenuated by almost 20 dB, while noises around 2 kHz can be heard as if not wearing a headphone at all). Thus, the user can be restricted to only being able to transition between full ANC and various degrees of muffling with unnatural resonances (i.e., reflected in the sporadic and unbalanced graphical representation among the frequency ranges). In these examples, this unbalanced attenuation hinders providing a user with an accurate frequency representation of the desired source of sound or frequency range of sounds (e.g., a range of ambient noise frequencies). Thus, a solution for flat or balanced attenuation, like that described herein, is desired.

Figure 7:
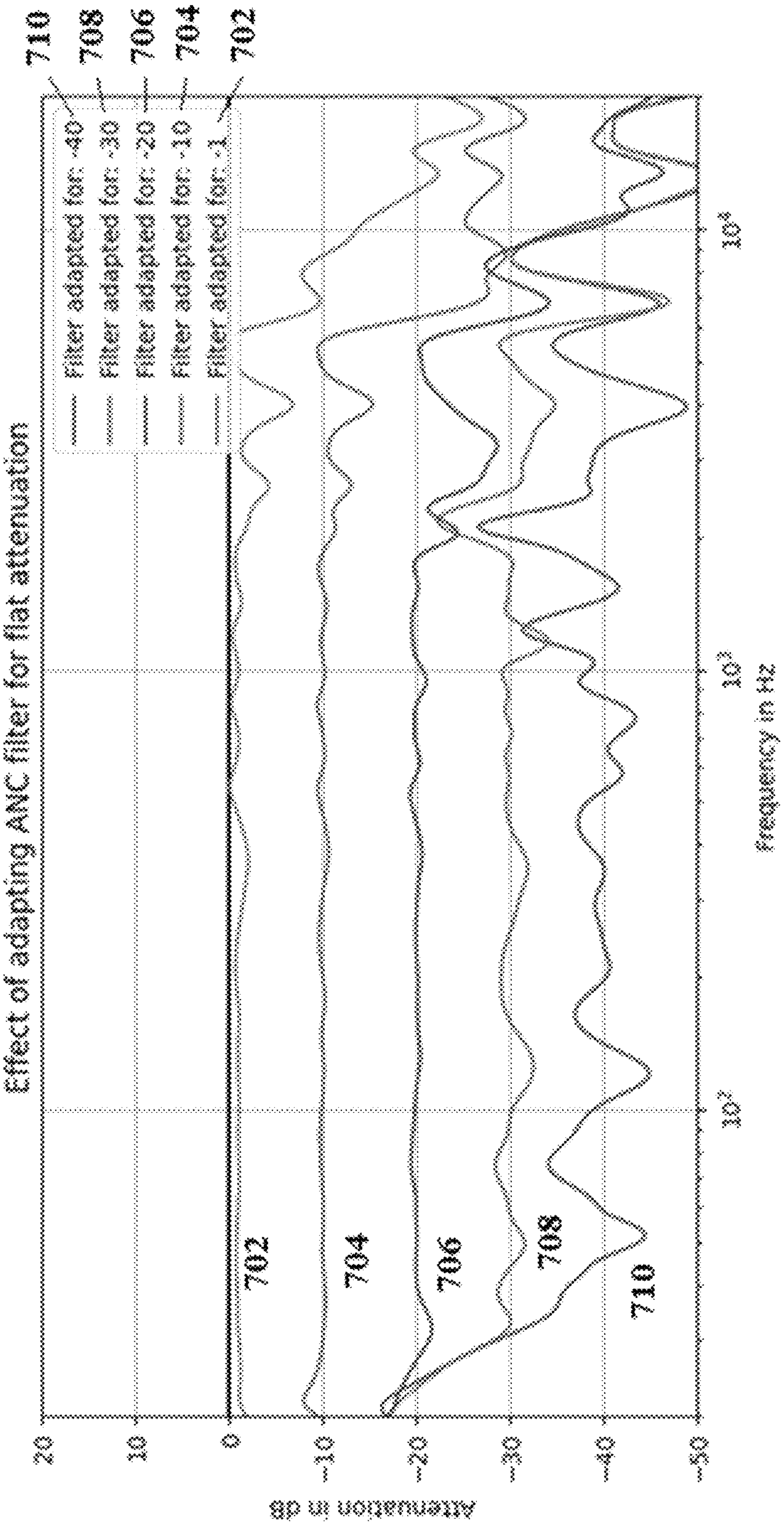
FIG. 7 is a graphic illustration showing the effect of adapting ANC filters for flat attenuation, according to embodiments.

FIG. 7 is a graphic illustration showing the effect of adapting ANC filters for flat attenuation, according to embodiments. In contrast with conventional systems, a wearable device according to embodiments of this disclosure can implement the filter design described herein to achieve flat or flatter attenuation of some or all of an audio signal in order to provide a user-selectable audio signal output style. In embodiments, the wearable device can include feedforward filters 310A and 310B, which can utilize a set of parameters (e.g., coefficients) in ANC. In embodiments, feedforward filters 310A and 310B can be tuned individually for a plurality of available attenuation steps, to correspond with a selection made via attenuation input 112. In embodiments, the individual tunability can be in addition to or alternative to only being able to tune the gain of the feedforward filters. As such, a flat or relatively flat attenuation at all attenuation levels, and/or a greater number of attenuation levels, can be achieved across frequency ranges and decibel ranges or at least a greater range of frequencies and decibels compared to previous ANC solutions, as compared to FIG. 6.

As depicted, the amount of SPL reduced, measured in decibels (dB), is depicted graphically as a function of frequency (Hz). As depicted the noise attenuation level is expressed as the y-axis and the frequency is expressed as the x-axis. Five example scenarios are depicted to illustrate how effective attenuation is at varying frequency levels and with filters adapted for various attenuation levels. For example, scenario 702 illustrates the effectiveness of total noise attenuation with one or more filters adapted for −1 dB of attenuation. For example, scenario 704 illustrates the effectiveness of total noise attenuation with one or more filters adapted for −10 dB of attenuation. For example, scenario 706 illustrates the effectiveness of total noise attenuation with one or more filters adapted for −20 dB of attenuation. For example, scenario 708 illustrates the effectiveness of total noise attenuation with one or more filters adapted for −30 dB of attenuation. For example, scenario 710 illustrates the effectiveness of total noise attenuation with one or more filters adapted for −40 dB of attenuation. As opposed to previous wearable devices utilizing ANC technologies that only implement the ability to adjust the ANC gain offset, implementing the filter design provides a flat or relatively flat attenuation across the frequency spectrum instead of a sporadic and unbalanced attenuation. Particularly, a major benefit can be seen up to, if not greater than, frequencies of at least 1 kHz, 2.5 kHz, 5 kHz, 15 kHz, 20 kHz, etc., and with an attenuation level of at least −30 dB. It is clear from comparing FIG. 6 with FIG. 7, utilizing the filter design strategy more effectively delivers a flatter or more balanced attenuation across the frequency spectrum, which in turn allows users to enjoy a more balanced sound that does not have too little bass or too little treble. In embodiments, a user can experience a more natural sound but at a more preferred attenuation level. It is noted that there is high frequency roll off in which it can be increasingly more difficult to effectively attenuate noise at a flat or balanced level across the higher frequency spectrum. In embodiments, this high frequency roll off can be necessary to avoid boosting microphone noise.

In embodiments, feedback ANC can be turned on in all operating modes and the filter tuning can take the feedback ANC into account. For example, if the feedback ANC system achieves −20 dB attenuation at a certain band, a −5 dB attenuation feedforward filter parameter set would not only compensate the passive attenuation, but also compensate the active attenuation of the feedback system and boost 15 dB.

Accordingly, this disclosure includes the following clauses:

Clause 1: A wearable audio device comprising: at least one speaker to provide an initial audio output signal; at least one sensor arranged to: sense at least one characteristic of the initial audio output signal, sense noise external to the wearable audio device, and provide at least one sensor signal related to at least one characteristic of the sensed initial audio output signal and at least one characteristic of the sensed noise; at least one input arranged to accept an input related to a desired level of attenuation of the noise; a processor arranged to: receive the at least one sensor signal and the selected desired level of attenuation, select at least one coefficient from a coefficient table based on the at least one sensor signal or the selected desired level of attenuation, and provide an attenuation signal related to the selected at least one coefficient; and at least one filter arranged to receive the attenuation signal from the processor and produce a filtered audio signal based on the attenuation signal, wherein the at least one speaker is configured to provide an attenuated audio output based on the filtered audio signal.

Clause 2: The wearable audio device of clause 1, wherein the desired level of attenuation is selected from a plurality of levels of attenuation, each level corresponding to at least one coefficient in the coefficient table.

Clause 3: The wearable device of clause 2, wherein there are at least 30 levels in the plurality of levels of attenuation.

Clause 4: The wearable audio device of clause 1, wherein the coefficient table comprises a plurality of coefficients computed from a set of filter parameters.

Clause 5: The wearable audio device of clause 4, wherein the coefficient table is stored in firmware of the wearable audio device.

Clause 6: The wearable audio device of clause 4, wherein the plurality of coefficients in the coefficient table are computed by the processor.

Clause 7: The wearable audio device of clause 1, wherein the attenuated audio output provides a flatter attenuation across a plurality of frequencies and a plurality of decibel levels as compared with the initial audio output signal.

Clause 8: The wearable audio device of clause 7, wherein the plurality of frequencies includes a range of frequencies between 1 Hz and 20 KHz.

Clause 9: The wearable audio device of clause 7, wherein the plurality of decibel levels includes a range between −50 dB and 12 dB.

Clause 10: The wearable audio device of clause 1, wherein the at least one filter is at least one of a biquad filter or a finite impulse response filter.

Clause 11: The wearable audio device of clause 1, wherein: the at least one sensor comprises: a first sensor to sense at least one characteristic of the initial audio output signal and a second sensor to sense noise external to the wearable audio device; and wherein the at least one sensor signal comprises: a first sensor signal related to at least one characteristic of the sensed initial audio output signal from the first sensor, and a second sensor signal related to at least one characteristic of the sensed noise from the second sensor.

In clause 12, a method comprises: correlating a plurality of filter coefficients with a plurality of user-selectable audio attenuation levels to form a coefficient table; and storing the coefficient table on a wearable audio device.

Clause 13: The method of clause 12, further comprising providing a user input on the wearable audio device for selection of the user-selectable audio attenuation level.

Clause 14: The method of clause 13, wherein storing the coefficient table on the wearable audio device comprises storing the coefficient table in firmware of the wearable audio device.

Clause 15: The method of clause 12, further comprising providing at least one sensor in the wearable audio device to: sense at least one characteristic of an initial audio output signal of the wearable audio device, sense noise external to the wearable audio device, and provide at least one sensor signal related to at least one characteristic of the sensed initial audio output signal and at least one characteristic of the sensed noise.

Clause 16: The method of clause 15, further comprising providing a processor in the wearable audio device to: receive the at least one sensor signal and a user-selected audio attenuation level, select at least one coefficient from the coefficient table based on the at least one sensor signal or the user-selected audio attenuation level, and provide an attenuation signal related to the selected at least one coefficient.

Clause 17: The method of clause 16, further comprising: providing at least one filter in the wearable audio device; receiving the attenuation signal by the at least one filter; and produce a filtered audio signal based on the attenuation signal.

Clause 18: The method of clause 17, further comprising providing an attenuation audio output by the wearable audio device to the user based on the filtered audio signal.

Various embodiments of systems, devices, and methods have been described herein. These embodiments are given only by way of example and are not intended to limit the scope of the disclosure. It should be appreciated, moreover, that the various features of the embodiments that have been described may be combined in various ways to produce numerous additional embodiments. Moreover, while various materials, dimensions, shapes, configurations, and locations, etc., have been described for use with disclosed embodiments, others besides those disclosed may be utilized without exceeding the scope of the disclosure.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A wearable audio device comprising:

at least one speaker to provide an initial audio output signal;

at least one sensor arranged to:

sense at least one characteristic of the initial audio output signal, sense noise external to the wearable audio device, and provide at least one sensor signal related to at least one characteristic of the sensed initial audio output signal and at least one characteristic of the sensed noise;

at least one input arranged to accept an input related to a desired level of attenuation of the noise;

a processor arranged to:

receive the at least one sensor signal and the selected desired level of attenuation, select at least one coefficient from a coefficient table based on the at least one sensor signal or the selected desired level of attenuation, and provide an attenuation signal related to the selected at least one coefficient; and at least one filter arranged to receive the attenuation signal from the processor and produce a filtered audio signal based on the attenuation signal, wherein the at least one speaker is configured to provide an attenuated audio output based on the filtered audio signal.

2. The wearable audio device of claim 1, wherein the desired level of attenuation is selected from a plurality of levels of attenuation, each level corresponding to at least one coefficient in the coefficient table.

3. The wearable audio device of claim 2, wherein there are at least 30 levels in the plurality of levels of attenuation.

4. The wearable audio device of claim 1, wherein the coefficient table comprises a plurality of coefficients computed from a set of filter parameters.

5. The wearable audio device of claim 4, wherein the coefficient table is stored in firmware of the wearable audio device.

6. The wearable audio device of claim 4, wherein the plurality of coefficients in the coefficient table are computed by the processor.

7. The wearable audio device of claim 1, wherein the attenuated audio output provides a flatter attenuation across a plurality of frequencies and a plurality of decibel levels as compared with the initial audio output signal.

8. The wearable audio device of claim 7, wherein the plurality of frequencies includes a range of frequencies between 1 Hz and 20 kHz.

9. The wearable audio device of claim 7, wherein the plurality of decibel levels includes a range between −50 dB and 12 db.

10. The wearable audio device of claim 1, wherein the at least one filter is at least one of a biquad filter or a finite impulse response filter.

11. The wearable audio device of claim 1, wherein:

the at least one sensor comprises:

a first sensor to sense at least one characteristic of the initial audio output signal and a second sensor to sense noise external to the wearable audio device; and wherein the at least one sensor signal comprises:

a first sensor signal related to at least one characteristic of the sensed initial audio output signal from the first sensor, and a second sensor signal related to at least one characteristic of the sensed noise from the second sensor.

12. A method comprising:

correlating a plurality of filter coefficients with a plurality of user-selectable audio attenuation levels to form a coefficient table; and storing the coefficient table on a wearable audio device.

13. The method of claim 12, further comprising providing a user input on the wearable audio device for selection of the user-selectable audio attenuation level.

14. The method of claim 13, wherein storing the coefficient table on the wearable audio device comprises storing the coefficient table in firmware of the wearable audio device.

15. The method of claim 12, further comprising providing at least one sensor in the wearable audio device to:

sense at least one characteristic of an initial audio output signal of the wearable audio device, sense noise external to the wearable audio device, and provide at least one sensor signal related to at least one characteristic of the sensed initial audio output signal and at least one characteristic of the sensed noise.

16. The method of claim 15, further comprising providing a processor in the wearable audio device to:

receive the at least one sensor signal and a user-selected audio attenuation level, select at least one coefficient from the coefficient table based on the at least one sensor signal or the user-selected audio attenuation level, and provide an attenuation signal related to the selected at least one coefficient.

17. The method of claim 16, further comprising:

providing at least one filter in the wearable audio device;

receiving the attenuation signal by the at least one filter; and produce a filtered audio signal based on the attenuation signal.

18. The method of claim 17, further comprising providing an attenuation audio output by the wearable audio device to the user based on the filtered audio signal.

* * * * *